United States Patent [19]

Auracher

[11] Patent Number: 5,357,590
[45] Date of Patent: Oct. 18, 1994

[54] DEVICE FOR OPTICALLY COUPLING A PLURALITY OF FIRST OPTICAL WAVEGUIDES TO A PLURALITY OF SECOND OPTICAL WAVEGUIDES

[75] Inventor: Franz Auracher, Baierbrunn, Fed. Rep. of Germany

[73] Assignee: Siemens Aktiengesellshcaft, Munich, Fed. Rep. of Germany

[21] Appl. No.: 43,813

[22] Filed: Apr. 7, 1993

[30] Foreign Application Priority Data

Apr. 16, 1992 [DE] Fed. Rep. of Germany ....... 4212857

[51] Int. Cl.⁵ .......................... G02B 6/32; G02B 6/26
[52] U.S. Cl. ........................................ 385/33; 385/14;
385/35; 385/49; 385/52; 385/88; 385/89;
385/129; 385/130
[58] Field of Search .................. 385/31, 33, 35, 38,
385/49, 50, 52, 74, 88, 89, 92, 93, 14, 129, 130,
131, 132

[56] References Cited

U.S. PATENT DOCUMENTS

| | | | |
|---|---|---|---|
| 4,119,362 | 10/1978 | Holzman | 385/33 X |
| 4,451,115 | 5/1984 | Nicia et al. | 385/74 X |
| 4,753,508 | 6/1988 | Meuleman | 385/74 X |
| 4,826,272 | 5/1989 | Pimpinella et al. | 385/93 X |
| 4,875,750 | 10/1989 | Spaeth et al. | 385/35 X |
| 4,890,895 | 1/1990 | Zavracky et al. | 385/49 X |
| 4,919,506 | 4/1990 | Covey | 385/35 X |
| 4,995,695 | 2/1991 | Pimpinella et al. | 385/49 X |
| 5,257,332 | 10/1993 | Pimpinella | 385/33 X |
| 5,260,587 | 11/1993 | Sato | 385/49 |
| 5,281,301 | 1/1994 | Basavanhally | 385/33 X |

FOREIGN PATENT DOCUMENTS

| | | | |
|---|---|---|---|
| 0183302 | 6/1986 | European Pat. Off. | 385/49 X |
| 0331331 | 9/1989 | European Pat. Off. | 385/49 X |
| 0402612 | 12/1990 | European Pat. Off. | 385/35 X |
| 2748503 | 8/1978 | Fed. Rep. of Germany | 385/33 X |
| 3230152 | 2/1984 | Fed. Rep. of Germany | 385/33 X |
| 4024709 | 2/1992 | Fed. Rep. of Germany | 385/33 X |

OTHER PUBLICATIONS

Abstract of Japanese No. 58-171013 of Oct. 7, 1983, *Patent Abstracts of Japan*, vol. 8, No. 10, (P248) [1447] Jan. 18, 1984.

Iga, "Surface Emitting Lasers and Parallel Operating Devices-Fundamentals and Prospects-" *IEICE Transactions of Fundamentals of Electronics, Communications and Computer Sciences*, vol. E75-A (1992) Jan., No. 1, Tokyo, Japan, pp. 12-19.

*Primary Examiner*—Brian Healy
*Attorney, Agent, or Firm*—Hill, Steadman & Simpson

[57] ABSTRACT

A device, which provides a high positioning precision and good coupling efficiency for producing an optical coupling between a plurality of first optical waveguides having one spot diameter and a plurality of second optical waveguides having a different spot diameter, comprises optical lenses and a plate arranged between the end faces of the first and second waveguides lying opposite to one another, the plate has one flat surface facing toward the first waveguides and a second flat surface facing toward the second waveguides, the plate having an arrangement for positioning an optical lens between each pair of waveguides. The optical lenses may be planar lenses formed on a flat surface of the plate or may be spherical lenses held in conical depressions on one of the surfaces of the plate. In one embodiment, the plate has depressions on both sides, which may receive spherical lenses. In the arrangement with the planar lenses, the opposite side may be free of depressions or have depressions for receiving optical fibers forming one of the groups of waveguides.

24 Claims, 4 Drawing Sheets

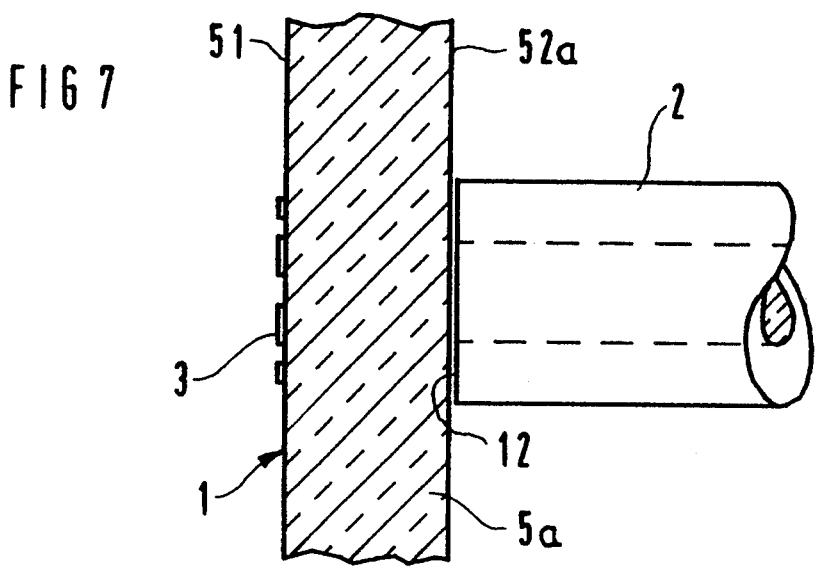
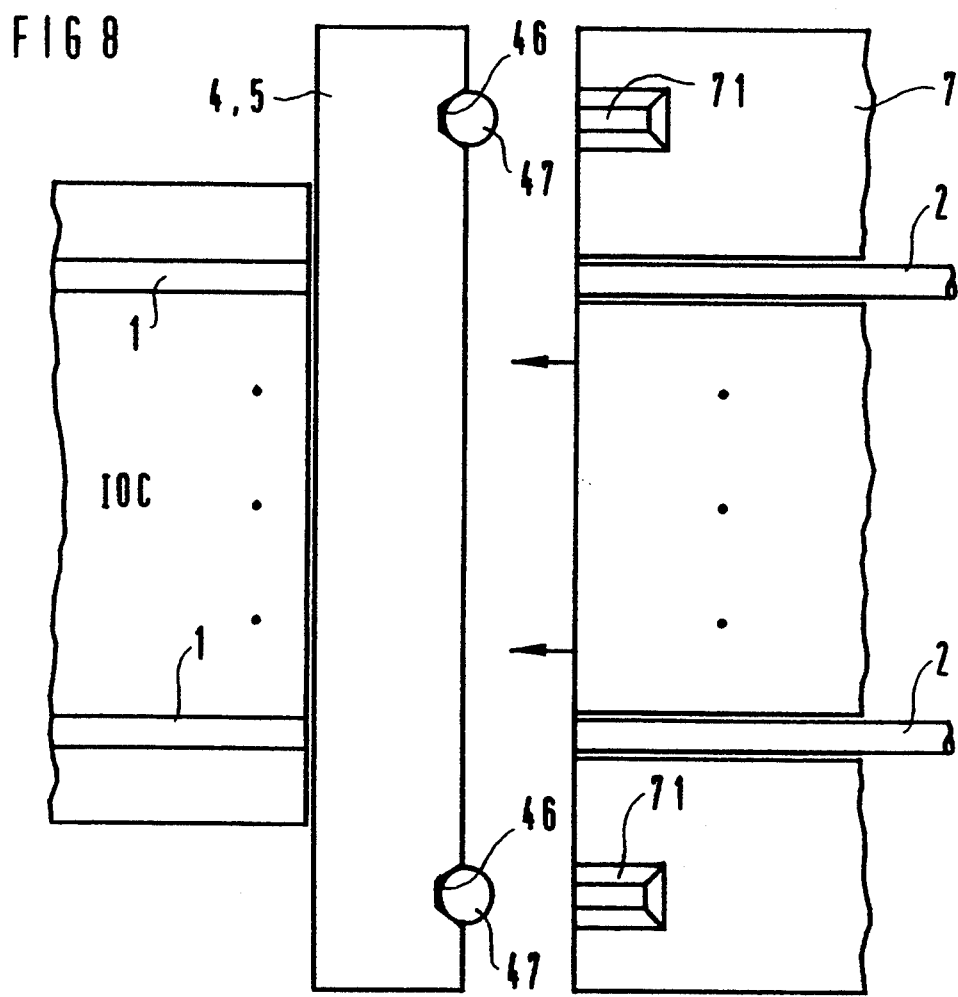

DEVICE FOR OPTICALLY COUPLING A PLURALITY OF FIRST OPTICAL WAVEGUIDES TO A PLURALITY OF SECOND OPTICAL WAVEGUIDES

BACKGROUND OF THE INVENTION

The present invention is directed to an arrangement for producing an optical coupling between a plurality of first optical waveguides and a plurality of second optical waveguides.

In IOCs, which can be integrated optical circuits, planar optical waveguide circuits or hybrid optical circuits, there is often the task of coupling a plurality of waveguides, which usually have identical spacing between their axes, to optical fibers or to other optical waveguide circuits. This task is particularly difficult when the spot diameters of the optical wave guided in the waveguides are extremely small and, moreover, do not match with the spot diameters of the optical waves guided in the optical fibers or the second optical waveguide circuit which is to be coupled to the first group.

Typical spot diameters of an optical wave having a range of 1.3 $\mu$m through 1.5 $\mu$ wavelength lie at 10 $\mu$m when guided in a monomode optical fiber. By contrast, waveguides of IOCs, particularly when formed of a III/V material system, which includes GaAlAs or InGaAsP, have a typical spot diameter of 2 $\mu$m. In order to achieve a good coupling efficiency, the spot diameters must be matched to one another, for example by optical lenses or tapers, and the positions of the spots must be adjusted extremely precisely relative to one another. The above-recited spot diameters, for example, require a lateral adjustment precision of approximate $\pm 0.5$ $\mu$m for the axis of the waveguide of the IOCs with respect to the fiber spot, which has been demagnified with the lens or a taper, and an axial adjustment in the axial direction of approximately 2 $\mu$m.

An arrangement for producing an optical coupling between a plurality of waveguides of an IOC and a plurality of optical fibers have been suggested. In one of these arrangements, the fibers are arranged and held in V-channels that are fashioned in the surface of a carrier member. The fibers are, thus, held so that they end before an edge of the member so that end surfaces or end faces of the fibers are arranged at a distance from this edge. Depressions for accepting and holding spherical lenses are fashioned in the surface between the edge and the end faces of the fibers at a distance from these end faces. Each of these depressions has a rectangular cross section and tapers pyramidally in the direction perpendicular to the surface and toward the inside of the carrier member from a maximum diameter to a minimum diameter which is greater than zero. A connecting trench is constructed in the surface of the carrier member between every end face of the fiber and the conical depression fashioned in front of this end face. This connecting trench assures an undisturbed propagation of the optical wave between the spherical lens held in this depression and this end face.

The waveguides of an IOC end at an edge of the surface of the substrate on which they are integrated, so that the end faces of these waveguides lie at this edge. The edge of the IOC is arranged just opposite the edge of the carrier member for the fibers so that every end face of the waveguide of the IOC lies opposite an end face of the fibers. Thus, a spherical lens is situated between every pair of end faces lying opposite one another.

The carrier member for the fibers of this known arrangement is composed of silicon, wherein the V-channels, the connecting trenches and the conical depressions are produced by preferential etching. Width and depth of the etched structures can typically observed with a precision of approximately 1 $\mu$m. This is adequate for the positioning of the fibers vis-a-vis the lenses. However, approximately 0.5 $\mu$m must be demanded for the positional precision of the lenses with respect to the axes of the IOC. Underetching of the mask employed for the manufacture of the etched structure or a non-uniform etching rate over the surface of the carrier member of silicon, however, may lead to significantly greater deviations of these centers of the spherical lenses from their desired and prescribed position. This method, thus, does not seem suitable for satisfying the extreme tolerance demands that are made thereon. Another disadvantage is that the packing density of the waveguides is limited by the relatively large spherical lenses having a diameter of $\geq 250$ $\mu$m.

An arrangement for producing an optical coupling between a plurality of waveguides of an IOC and a plurality of optical fibers has likewise already been proposed, wherein every end face of a waveguide of the IOC has an end of an end section of a fiber tapering taper-like toward this end lying opposite it.

In this arrangement, the fibers are arranged and held on a surface of a carrier member with the taper-shaped end section of the fiber freely projecting beyond the edge of the surface of the carrier member. The positions of the ends of the taper-shaped end sections are defined by an aperture mask. This aperture mask is composed of a plate arranged between the waveguides of the IOC and the fibers and has one flat surface facing toward the waveguides and one flat surface facing toward the fibers. Through holes of the masks, which extend from one flat surface to the other, are fashioned in the plate, and these through holes conically taper from the flat side or surface facing toward the fiber in the direction toward the flat side facing toward the waveguides of the IOC from a maximum diameter that is larger than the diameter of the fibers to a minimum diameter that is smaller than or equal to the diameter of the ends of the taper-shaped end sections.

The plate is composed of a silicon wafer wherein the through, conical holes are produced with privileged or preferential etching. The advantage is that the center of the holes can be extremely precisely defined with planar technology. Lateral deviations of the centers of the holes from the desired position can occur if the sides of the walls of the pyramidally conical holes are etched at different speeds (the positions of the holes are defined on the flat side of the silicon wafer facing away from the waveguides of the IOC) or in that the etching mask employed is asymmetrically underetched. The greatest errors in the position of the ends or tips of the taper-like end sections, however, probably occur when small blow-outs of at least 1 $\mu$m appear at a contacting location of the taper-shaped end section with the plate in the hole or when the taper-shaped end section itself has asymmetries. Both these are especially problematical.

SUMMARY OF THE INVENTION

The object of the present invention is to provide an arrangement for producing an optical coupling between a plurality of first waveguides, which have a first spot diameter, and a plurality of second waveguides, which have a second spot diameter different from the first spot diameter, which coupling provides a high positioning precision and a good coupling efficiency.

The arrangement of the invention is also advantageously employable for producing an optical coupling between a plurality of first optical waveguides and a plurality of second optical waveguides, wherein the spot diameter of the waveguides guided in these waveguides are the same.

To accomplish these goals, the invention is directed to an improvement in a coupling arrangement wherein the first and second waveguides are arranged with their end faces lying opposite to one another in pairs and arranged at a distance from one another, and there is an optical lens arranged between the end faces of the first and second waveguides of each pair. The improvement is that the carrier member is composed of a plate which is arranged between the end face of the first and second waveguides lying opposite one another and the plate has one flat surface facing toward the first waveguides and one flat surface facing toward the second waveguides and that the plate has means on one surface for holding the lenses between the two end faces. The lenses may be spherical lenses and the means is fashioned as a depression in at least one of the flat surfaces of the plate with the conical taper and diameter from the one flat surface in the direction toward the other flat surface of the plate. In certain embodiments, the plate is formed of a material which is transparent to the wavelengths in the optical waveguides. In the other embodiments, depressions extend inward from both surfaces to form a through hole. In another embodiment, instead of using a spherical lens carried in a depression, the means hold a planar lens arrangement that is fashioned on the one surface facing one of the first and second waveguides. The other surface can be either without depressions or provided with depressions to facilitate locating the end of the other waveguide.

Other advantages and features of the invention will be readily apparent from the following description of the preferred embodiments, the drawings and claims.

BRIEF DESCRIPTION OF THE DRAWINGS

FIG. 7 is a cross sectional view with portions in elevation for purposes of illustration of a sixth embodiment of the present invention; and FIG. 8 is a plan view of an arrangement having automatic adjustment means.

DESCRIPTION OF THE PREFERRED EMBODIMENTS

The principles of the present invention are particularly useful when incorporated in a coupling device for coupling first waveguides, which are waveguides of an IOC, and second waveguides, which are optical fibers, or are waveguides of another waveguide circuit, such as another IOC. While the embodiment of FIG. 1 shows the fibers 2 with the IOC waveguides being the waveguides 1, these could be reversed, if desired.

Figure 1:
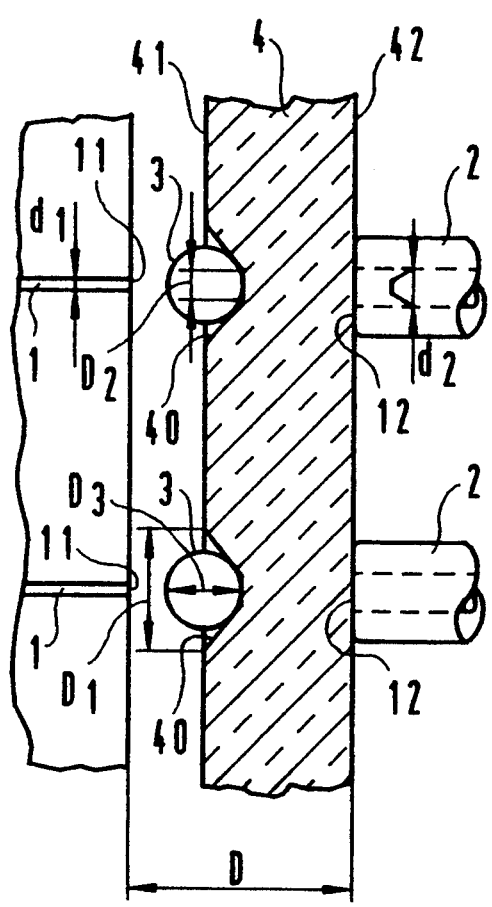
FIG. 1 is a cross sectional view with portions in elevation for purposes of illustration of a coupling arrangement in accordance with the present invention.

In the first embodiment of FIG. 1, a flat side or surface 41 of a plate 4 facing toward the first waveguides 1 have depressions 40 that are conically tapered in diameter from the flat surface 41 in the direction toward the other flat surface 42 that faces toward the second waveguides 2. The depressions 40 taper from a maximum diameter $D_1$ to a minimum diameter $D_2$, which is greater than zero. The other flat surface 42 has no depressions or is free of depressions.

Figure 6:
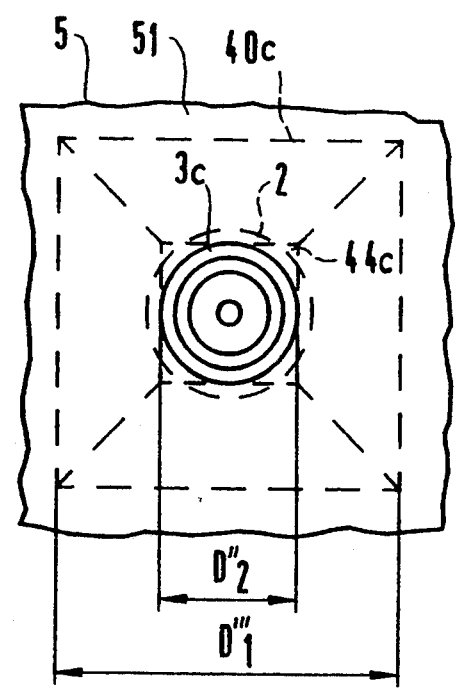
FIG. 6 is a plan view taken from the direction of arrow VI of FIG. 5 of the embodiment of FIG. 5.

The plate 4 is advantageously composed of silicon or of some other material which is etchable by privileged etching. The depressions 40 introduced into the flat surface 41 are privileged etchings and are then shaped like truncated pyramids and are quadratic in plan view, as shown in FIG. 6.

A spherical lens 3 having a diameter $D_3$ that is smaller than the maximum diameter $D_1$ of the depression 40 is arranged in every depression 40. The second waveguide 2, which is formed by the fiber, has its end 12 abutting flush against the other flat side 42 of the plate 4.

The distance between the end faces 11 of the first waveguides 1 and the end faces 12 of the fibers 2 lie opposite one another and the diameter $D_3$ and the position of the spherical lens 3 are arranged between these end faces 11 and 12 and are dimensioned so that the spot diameter $d_1$ of an optical wave guided in the waveguide 1 is matched by the lens 3 to the spot diameter $d_2$ of the optical wave guided in the second waveguide 2, which is the fiber. The material of the plate 4 is, thus, to be selected so that the plate 4 is transmissive for the wavelength of this optical wave. The spherical lens 3 has a typical diameter $D_3$ of 250 $\mu$ through 500 $\mu$m. The spherical lenses, moreover, have the advantage that they can be manufactured significantly more reproducibly than the fiber tapers.

Figure 2:
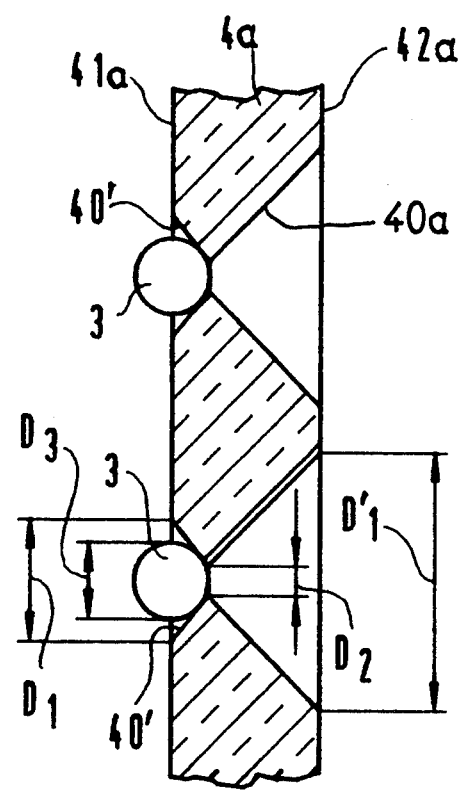
FIG. 2 is a cross sectional view with portions in elevation for purposes of illustration of a second embodiment of the coupling arrangement of the present invention.

The second embodiment of the coupling device is illustrated in FIG. 2 and differs from that of FIG. 1 only in that the depressions 40' are defined by through hole openings from one flat surface to the other that conically initiate tapers from the flat surface 41a in the direction toward the other flat surface 42a of the plate 4a from a maximum diameter $D_1$ to a minimum diameter $D_2$. Beginning at this point, it intercepts a depression 40a, which is conical and extends in a reverse direction inward from the flat surface 42a. The depression 40a has a maximum diameter $D'_1$ on the other flat surface 42a, which is expediently selected to be larger than the diameter of the second waveguide 2, which is in the form of a fiber, so that this waveguide can project into the opening 40a and can, therefore, be better centered. It is not necessary in this second embodiment that the plate 4a be transparent for the wavelength of the optical wave guided in the first and second waveguide. The minimum diameter $D_2$ is to be dimensioned so that the optical wave coupled out from the particular waveguide can propagate through the opening without being disturbed.

Figure 3:
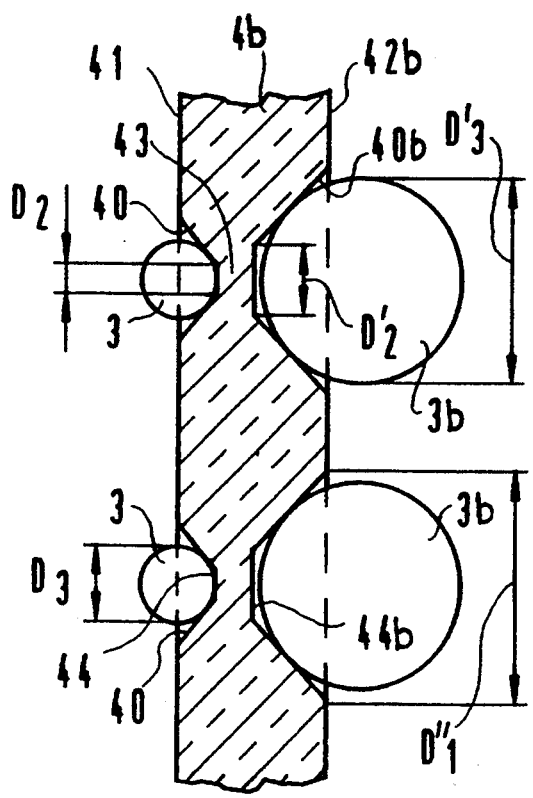
FIG. 3 is a cross sectional view with portions in elevation for purposes of illustration showing a third embodiment of the coupling arrangement in accordance with the present invention.

A third embodiment of the coupling device, which is illustrated in FIG. 3, differs from the first embodiment of FIG. 1 in that the depressions 40 are not only fashioned on the one flat surface 41, but depressions 40b are on the other flat surface 42b. These depressions 40 and 40b lie opposite one another in pairs and are separated from one another by a wall 43 of the material of the plate 4b. Moreover, respectively spherical lenses 3 are arranged in the depression 40 on the flat surface 41 and lenses 3b with a diameter $D'_3$ are arranged in depressions 40b on the other flat surface 42b of the plate 4b. Every pair of spherical lenses 3 and 3b arranged in a pair of depressions 40 and 40b lie opposite one another and form a two-lens imaging system for the end faces 11 and 12 of the first and second waveguides 1 and 2, which lie opposite one another and between which this pair of spherical lenses 3, 3b are arranged. There is a great degree of freedom for the dimensioning of such a system.

In the example of FIG. 3, the spherical lenses 3b in the depressions 40b are fashioned larger than the spherical lenses 3 in the depressions 40, because the spot diameter of the optical wave guided in the second waveguide 2, which is in the form of a fiber, is larger than that of the optical waves guided in the first waveguide 1. Correspondingly, the maximum diameter $D''_1$ of the depression 40b on the surface 42b is also to be selected larger than the maximum diameter $D_1$ of the depression 40 on the flat surface 41 of the plate 4b.

In the example of FIG. 3, the minimum diameter $D'_2$ of every base 44b of the depression 40b on the flat surface 42 is also larger than the minimum diameter $D_2$ of every base 44 of the depression 40 of the flat surface 41.

Figure 4:
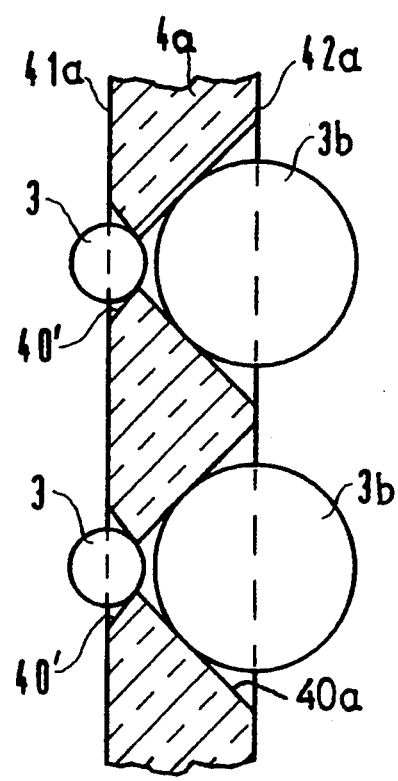
FIG. 4 is a cross sectional view with portions in elevation for purposes of illustration of a fourth embodiment of the coupling arrangement of the present invention.

A fourth embodiment is illustrated in FIG. 4 and differs from the third exemplary embodiment of FIG. 3 only in that the plate 4a is constructed like the plate 4a of the second embodiment of FIG. 2 instead of being a plate 4b of the third embodiment. Thus, while the material of the plate 4b must be transparent for the optical waves guided in the waveguides 1 and 3 in the third exemplary embodiment of FIG. 3, this is not required for the material of the plate 4a, according to the fourth embodiment of FIG. 4. Whereas a fiber projects into the depression 40a from the second or other flat surface 42 of the plate 4a in the second embodiment of FIG. 2, a spherical lens 3b is arranged in the depression 40a. The depressions 40a and 40 form a double-conical through opening in the plate 4a as used in the fourth embodiment of FIG. 4.

The exemplary embodiments of FIGS. 1–4 have the advantage that the grid dimension of the grid established by the depressions, such as 40 and 40a or 40 and 40b, can be rather exactly observed. The points of contact of the spherical lenses 3 and 3b in the depressions 40 and 40a and 40b, which were etched in the shape of truncated pyramids within the plates 4, 4a and 4b, all lie within the plate so that a blow-out at the flat side 41 or 42 of the plate has no influence on the centering of the lens 3. Moreover, spherical lenses can be easily manufactured with significantly more reproducibility than fiber tapers.

Figure 5:
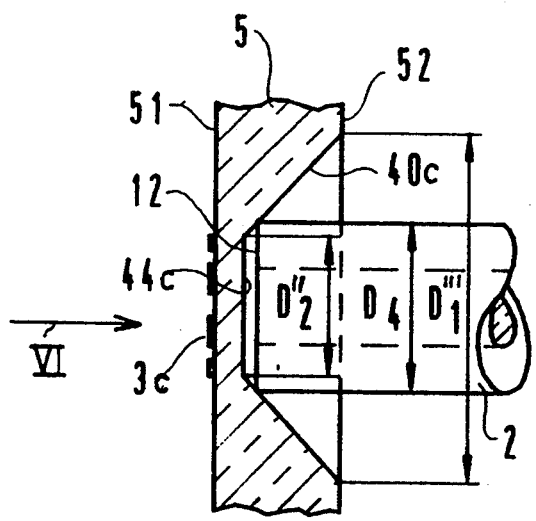
FIG. 5 is a partial cross sectional view with portions in elevation for purposes of illustration of a fifth embodiment of a coupling arrangement in accordance with the present invention.

A fifth exemplary embodiment is illustrated in FIGS. 5 and 6. In this embodiment, a plate 5 has a flat surface 51 facing toward the first waveguides and a flat surface 52 facing toward the second waveguides 2. The second surface 52 has a depression 40c with a base 44c. A planar lens 3c, for example a Fresnel lens or a hologram, is directly applied to the one flat surface 51 and is arranged on the one flat surface 51 opposite the depression 40c and opposite the base or bottom surface 44c of a minimum diameter $D''_2$ of the depression 40c to be precise. In the simplest case, binary phase-Fresnel lenses, that are referred to as "zone plates", can be utilized. This method guarantees that the position of the lens centers can be observed with the same precision of a 0.1 μm through 0.2 μm as that of the first waveguides 1 of an IOC. The depressions 40c on the flat surface 52 of the plate 5 facing toward the second waveguides 2 can be employed for the fine positioning of these second waveguides 2. To that end, the maximum diameter $D'''_1$ of every depression 40c must be larger than the outside diameter $D_4$ of the second waveguide 2. The minimum diameter $D''_2$ is expediently made smaller than or equal to this outside diameter $D_4$. For fine positioning, the second waveguide 2 has its end face 12 introduced into the particular depression 40c until it comes into contact with the slanting side walls thereof. So that the wall of the plate 5 remaining between the planar lens 3c and the end face 12 of the second waveguide 2 does not cause any imaging errors, the bottom surface or base 44c of the depression must be extremely smooth and flatly plane-parallel to the flat side 51 facing toward the first waveguide 1. This also applies to the arrangement of FIG. 1 and of FIG. 3. In order to assure this and in order to simultaneously precisely observe the etching depth, the plate is doped, for example with boron, down to the depth of the bottom surface 44c of the depression 40c or a pn-junction is integrated. What can be achieved with suitable etching fluids is that the etching stops given a defined concentration of the dopant. The planar lenses 3 can also be applied onto the bottom surface 44c of the conical depression 40c.

A sixth embodiment of the connecting device is illustrated in FIG. 7. The fine positioning of the second waveguide 2 by depressions 40c on the flat surface 52 of the plate 5 facing toward the waveguide 2 has been eliminated. In this embodiment, flat surfaces 51 and 52a of the plate 5a will face toward the first and second waveguides 1 and 2 and are free of any depressions. The second waveguides 2 merely have their end faces 12 abutting flush against the flat surface 52a of the plate 5a, which faces toward these waveguides 2. Just like all the other, with the exception of the arrangement of FIG. 4, this arrangement is suitable for coupling two waveguide circuits, such as IOCs, having different spot diameters.

In order to observe the grid spacing of the second waveguides 2 in the form of fibers, it is expedient to fix these waveguides 2 to a surface of a fixing carrier member 7 illustrated in FIG. 8. In all exemplary embodiments, for example, V-shaped channels are etched in the carrier member 7, which is silicon. In particular, it is advantageous to undertake additional measures that will ensure an automatic adjustment of the second waveguides 2 relative to the grid-shaped arrangement of the lenses 3, which are not shown in FIG. 8. For example, this can be achieved in that a conical, for example pyramidal, depressions 46 for the acceptance of a small ball 47 are etched on the flat surfaces, such as 42 or 52, of the plate 4 or 5, which faces toward the second waveguide 2. These balls fit into channels 71, which are etched into the fixed carrier member 7 and are engaged with one another when the plates 4 or 5 and the fixed carrier member 7 are joined together.

For manufacturing the plate 4 or 5, respectively, and the fixing carrier member 7 for the second waveguides, methods other than those set forth above can also be utilized. This will enable the required precision, in particular the LIGA technology, as well as printed and transfer methods with "masters" produced in planar technology. Other single-crystal materials, for example GaAs, for which suitable privileged etching process are available can also be utilized instead of silicon. Surfaces lying in the beam path should be provided with an anti-reflection coating.

Although various minor modifications may be suggested by those versed in the art, it should be understood that I wish to embody within the scope of the patent granted hereon all such modifications as reasonably and properly come within the scope of my contribution to the art.

I claim:

1. In a device for producing an optical coupling between a plurality of first waveguides and a plurality of second waveguides, wherein the first and second waveguides have end faces which lie opposite one another in pairs and are arranged at a distance from one another and wherein optical lenses are arranged between every pair of the end faces of the first and second waveguides lying opposite one another, the improvement comprising a carrier member being formed of a plate arranged between the end faces of the first and second waveguides which lie opposite to one another, said plate having one flat surface facing toward the first waveguides and one flat surface facing toward the second waveguides, and the plate having means on one surface for holding lenses between the pairs of end faces of the first and second waveguides, at least one of the plurality of first and second waveguides being waveguides of an IOC which are integrated on a substrate with end faces at a rim edge of the substrate, and the means for holding lenses being on a flat surface of the carrier facing toward the end faces of the waveguides at said rim edge.

2. In a device according to claim 1, wherein the lenses are spherical lenses and the means for holding lenses includes a depression conically tapering from the one surface toward the interior of the carrier member from a maximum diameter to a minimum diameter, said minimum diameter being greater than zero.

3. In a device according to claim 1, wherein the carrier member is composed of a material that is transparent to a wavelength of an optical wave being guided in the first and second waveguides, wherein the means for holding the lenses is a flat surface of the plate and each of the lenses is composed of a planar lens arranged on said flat surface of the plate.

4. In a device for producing an optical coupling between a plurality of first optical waveguides and a plurality of second optical waveguides, said device having end faces of the first and second waveguides lying opposite to one another in pairs and arranged at a distance from one another, and an optical lens being positioned between every pair of end faces of the first and second waveguides, said lenses being held on a carrier member in a region of a depression fashioned on a surface of the carrier member and conically tapering from the surface in a direction toward the inside of the carrier member from a maximum diameter to a minimum diameter, said minimum diameter being greater than zero, the improvements comprising the carrier member being composed of a plate arranged between the end faces of the first and second waveguides lying opposite one another, said plate having one flat surface facing toward the first waveguides and one flat surface facing toward the second waveguides, at least one of the plurality of first and second waveguides being waveguides of an IOC, which waveguides are integrated on a substrate and have said end faces at a rim edge of the substrate and the depressions for holding the lenses being fashioned in at least one of the flat surfaces of the plate, said at least one flat surface facing the end faces of the waveguide of the IOC and the depressions being conically tapering in diameter from the one flat surface in the direction toward the other flat surface of the plate.

5. In a device according to claim 4, wherein the plate is composed of a material that is transparent for a wavelength of an optical wave being guided in the first and second waveguides.

6. In a device according to claim 4, wherein the minimum diameter of each depression is situated at a distance from the flat surface of the plate, which is different from zero.

7. In a device according to claim 4, which has depressions extending inward from each of the flat surfaces and separated one from the other by a wall of material of the plate, said material of the plate being transparent for the wavelength of an optical wave being guided in the first and second waveguides, each of the depressions conically tapering in diameter from a maximum diameter inward to a minimum diameter, which is greater than zero.

8. In a device according to claim 7, wherein the minimum diameter of the depressions situated on one flat surface of the plate is different from the minimum diameter of the depressions situated on the other flat surface of the plate.

9. In a device according to claim 7, wherein the maximum diameter of the depressions situated on one surface of the plate is different from the maximum diameter of the depressions situated on the other surface of the plate.

10. In a device according to claim 7, wherein the lenses are spherical lenses and are arranged and held in the depressions situated on one of the flat surfaces of the plate.

11. In a device according to claim 7, wherein the lenses are spherical lenses which are arranged and held in both of the depressions situated on one flat surface of the plate, as well as the depressions situated on the other flat surface of the plate.

12. In a device according to claim 11, wherein the spherical lenses held in depressions having different diameters have different diameters.

13. In a device according to claim 4, wherein the depression is defined by a through opening from one flat side in the direction toward the other flat side of the plate, said depression conically tapering in the direction toward the other flat side from a maximum diameter to a minimum diameter and then conically expands in a direction as the depression continues toward the other flat side from the minimum diameter to the maximum diameter.

14. In a device according to claim 13, wherein the maximum diameter of the depressions on one side is different from that on the other side and the lenses are spherical lenses being received in each of said depressions forming the through hole with the diameters of the spherical lenses being different.

15. In a device according to claim 4, which includes adjustment means for the automatic adjustment of the end face of the first and second waveguides relative to the depressions and lenses.

16. In a device according to claim 15, wherein the adjustment means includes a fixing carrier member on which one of the first and second waveguides are secured in the same arrangement as the optical lenses and said adjustment means has adjustment projections and depressions which are fashioned on the plate and on the fixing carrier member, said projections and depressions engaging into one another when the plate and fixing carrier member are joined together.

17. In a device according to claim 16, wherein the carrier member and the fixing carrier member are both formed of anisotropically etchable material and the depressions and channels are produced with planar technology.

18. In a device according to claim 17, wherein the anisotropically etchable material is composed of silicon.

19. In a device for producing an optical coupling between first optical waveguides and a plurality of second optical waveguides, said first and second waveguides having end faces that lie opposite to one another in pairs and being arranged at a distance from one another, and wherein optical lenses are held on a carrier member and are arranged between every pair of end faces of the first and second waveguides lying opposite one another, the improvements comprising the carrier member being composed of a plate arranged between the end faces of the first and second waveguides lying opposite one another, said plate having one flat surface facing toward the first waveguides and one flat surface facing toward the second waveguides and being composed of a material that is transparent for a wavelength of the optical wave being guided in the first and second waveguides, and wherein every optical lens is composed of a planar lens arranged on at least one of the flat surfaces of the plate.

20. In a device according to claim 19, wherein the two flat surfaces of the plate are free of depressions.

21. In a device according to claim 19, wherein a depression is formed in the other flat surface of the plate opposite each planar lens, which is arranged on the first flat surface of the plate, said depression being conically tapered from a maximum diameter to a minimum diameter from the other flat surface toward the first flat surface.

22. In a device according to claim 21, wherein each waveguide adjacent the depressions in an optical fiber with an outside diameter, and the maximum diameter of the depression is greater than the outside diameter of the optical fiber being received in said depression and the minimum diameter of the depression is $\leqq$ the outside diameter of the optical fiber.

23. In a device according to claim 19, which includes adjustment means for the automatic adjustment of the end faces of the first and second waveguides relative to the optical lenses.

24. In a device according to claim 23, wherein the adjustment means comprises a fixing carrier member for supporting one of the first and second waveguides in the same arrangement as the optical lenses on the carrier member, said carrier member and fixing carrier member having adjustment projections and depressions engaging one another when the fixing carrier member is joined to the carrier member.

* * * * *